US007332715B2

(12) United States Patent
Russ, IV et al.

(10) Patent No.: US 7,332,715 B2
(45) **Date of Patent: *Feb. 19, 2008**

(54) ATMOSPHERIC PRESSURE ION SOURCE HIGH PASS ION FILTER

(75) Inventors: Charles W. Russ, IV, Sunnyvale, CA (US); Steven M. Fischer, Hayward, CA (US); Robert K. Crawford, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,089

(22) Filed: Aug. 16, 2006

(65) Prior Publication Data

US 2006/0284106 A1 Dec. 21, 2006

Related U.S. Application Data

(63) Continuation of application No. 11/168,756, filed on Jun. 27, 2006, now Pat. No. 7,112,786, which is a continuation of application No. 10/229,669, filed on Aug. 28, 2002, now abandoned, which is a continuation of application No. 09/429,072, filed on Oct. 29, 1999, now abandoned.

(51) Int. Cl.
*B01D 59/44* (2006.01)

(52) U.S. Cl. ........................ 250/288; 250/282; 250/284

(58) Field of Classification Search ................ 250/288, 250/282
See application file for complete search history.

(56) References Cited

U.S. PATENT DOCUMENTS

| | | | | |
|---|---|---|---|---|
| 5,432,343 | A | 7/1995 | Gulcicek et al. | |
| 5,747,799 | A | 5/1998 | Franzen | |
| 5,825,027 | A * | 10/1998 | Takada et al. | 250/292 |
| 5,936,242 | A | 8/1999 | De La Mora et al. | |
| 5,998,787 | A * | 12/1999 | Hager | 250/282 |
| 6,002,130 | A | 12/1999 | Kato | |
| 6,075,243 | A | 6/2000 | Nabeshima et al. | |
| 6,465,779 | B1 | 10/2002 | Takada et al. | |
| 2001/0000618 | A1 | 5/2001 | Takada et al. | |
| 2002/0014585 | A1 | 2/2002 | Takada et al. | |

* cited by examiner

*Primary Examiner*—Jack I. Berman
*Assistant Examiner*—Johnnie L Smith, II

(57) ABSTRACT

For generation and delivery of ions from an ionization chamber through an ion entrance orifice to a mass analyzer operating at high vacuum, high pass ion filtration is effected within the ionization chamber by application of electrical potentials to an electrode associated with the ion entrance orifice and to an electrode between the ionization region and the ion entrance orifice to create a retarding electric field upstream from the ion entrance orifice. The retarding electric field hinders the movement to the ion entrance orifice of ions having drift velocities below a lower limit, and as the retarding voltage gradient is made steeper, the lower limit increases.

20 Claims, 3 Drawing Sheets

ATMOSPHERIC PRESSURE ION SOURCE HIGH PASS ION FILTER

CROSS REFERENCE TO RELATED APPLICATIONS

This is a continuation of application Ser. No. 11/168,756, filed Jun. 27, 2005, which application is a continuation of application Ser. No. 10/229,669, filed Aug. 28, 2002, which application is a continuation of application Ser. No. 09/429,072, filed Oct. 29, 1999, which applications are incorporated herein by reference in their entireities for all purposes.

FIELD OF THE INVENTION

This invention relay to mass spectometry and, particularly, to generation and delivery of ions to a mass analyzer operating at high vacuum.

BACKGROUND

Mass spectrometers have been shown to be particularly useful for analysis of liquid or gaseous samples, and mass spectrometry ("MS") can be coupled with gas chromatography ("GC") or liquid chromatography ("LC") for analysis of substances having a wide range of polarities and molecular weights in samples obtained from a wide range of sources.

Mass spectrometers employing atmospheric pressure ionization ("API") techniques can be particularly useful for obtaining ma spectra from liquid samples, and MS employing such ion sources are frequently used in conjunction with high performance liquid chromatography ("HPLC"), and combined HPLC/MS systems are commonly used for analysis of polar and ionic substances, including biomolecular species. In API techniques a liquid sample containing a mobile phase (e.g., solvent) and analytes is introduced into an ionization chamber and there converted to a charged dispersion or aerosol of fine droplets from which ions emerge as the liquid evaporates and the droplets shrink in size. The conversion of liquid to spray or aerosol can be accomplished by any of a variety of techniques. Evaporation of the liquid can be assisted, for example, by passing a flow of warm gas ("drying gas") through the cloud of droplets.

Considerable interest has developed, particularly in the pharmaceuticals and medical diagnostics industries, in employing mass spectrometry to analyze large numbers of samples that contain only a few analytes of interest. Typically the sources of the samples are biological fluids such as urine or blood. Samples from such sources contain significant quantities of substances that are not of interest in the analysis, and sample treatment for removal of these substances makes up a significant proportion of the cost of such analyses. Accordingly, some effort has been directed toward reducing the extent of sample treatment prior to introducing the sample to mass spectrometry apparatus. In one approach, tandem mass spectrometry ("MS/MS") has been used in an effort to reduce the need for sample preparation for simple target compound analysis. MS/MS systems are significantly more costly than MS systems. In another approach, described in U.S. Pat. No. 5,936,242, a laminar gas flow is established in a direction transverse to a gas flow axis within an analytical chamber, to separate ions in a complex mix according to their mobility.

SUMMARY

We have discovered that high pass ion filtration can be effected within an ionization chamber by application of electrical potentials to electrodes between the ionization region and the ion entrance orifice to create a retarding electric field upstream from the ion entrance orifice. The retarding electric field hinders the movement to the ion entrance orifice of ions having drift velocities below a lower limit, and as the retarding voltage gradient is made steeper, the lower limit increases. The apparatus is inexpensive to construct and simple to operate. The high pass ion filter according to the invention can provide for removal of lower drift velocity ions from the population of ions that are delivered to the mass analyzer.

In one general aspect the invention features apparatus for delivering ions to a mass analyzer operating at high vacuum. The apparatus includes an ionization chamber formed of chamber walls enclosing an ionization region and having a sample inlet and an ion entrance orifice that communicates downstream with a vacuum chamber. A first electrode is associated with the ion entrance orifice, and a second electrode has an orifice situated within the ionization chamber upstream from the ion entrance orifice. The ion entrance orifice and the second electrode orifice are aligned on an ion beam axis. The first and second electrodes are connected to a source of electrical potential. An electrical potential difference between the first and second electrodes creates an electric field upstream from the ion entrance orifice, retarding the movement to the ion entrance orifice of ions having drift velocities below a selected lower limit.

Electrodes are connected to 'a source' of electrical potential, as that term is used herein, when they are electrically connected to separate voltage sources, and also when any two or more of them are electrically connected to a common single source that is provided with circuitry (e.g., resistive networks) that can be employed to apply different voltages to the various electrodes.

The expression "drift velocity", as that term is used in describing the invention herein, is the mean ion velocity in a direction from within die ionization chamber toward the vacuum chamber through the electrode apertures in the region upstream from the ion entrance aperture. According to the invention, because ion movement from the ionization chamber toward the vacuum chamber is assisted by gas flow (against an opposing electrical potential gradient), ions having higher mobilities have lower drift velocities.

In some embodiments at least one pair of electrodes in addition to the first and second electrodes, each having an orifice aligned on the ion beam axis, is situated within the ionization chamber between the ionization region and the second electrode, and each is connected to a source of electrical potential. An electrical potential difference between the members of the pair of electrodes creates an electric field upstream from the second electrode, retarding movement of ions having drift velocities below a selected lower limit.

In some embodiments a third electrode has an orifice situated within the ionization chamber upstream from the second electrode aperture. A drying gas may be directed between the second and the third electrodes and upstream through the third electrode orifice toward the ionization region. An electrical potential difference applied across the third electrode and the second electrode accelerates ions from the ionization region though the orifices toward the ion entrance orifice, and the electrical potential difference between the first and second electrodes creates an electric field upstream from the ion entrance orifice, retarding the movement to the ion entrance orifice of ions having drift velocities below a selected lower limit.

In some embodiments the ionization source is an atmospheric pressure ionization source, and a space between the second and the third electrodes is connected to a source of gas, providing a flow of gas in an upstream direction through the second electrode orifice toward the ionization region.

In some embodiments the ion entrance orifice comprises an aperture in a plate, or the axial bore in a conduit such as a capillary.

Another general aspect the invention features a method for delivering ions to a mass analyzer operating at vacuum. The method employs apparatus that includes an ionization chamber formed of chamber walls enclosing an ionization region and having a sample inlet and an ion entrance orifice that communicates downs with a vacuum chamber, and includes a first electrode associated with the ion entrance orifice and a second electrode having an orifice sited upstream from the ion entrance orifice, configured so that the ion enhance orifice and the second electrode orifice are aligned on an ion beam axis. According to the method, electrical potential are applied to the electrodes such that a potential difference across the second electrode and the first electrode creates an electric field that reduces the flux to the ion entrance orifice of ions having lower drift velocities.

In some embodiments the method further includes providing a flow of gas in an upstream direction tough a third electrode orifice, situated upstream from the second orifice, toward the ionization region and, in such embodiments an electric potential difference is applied between the third and second electrodes to accelerate ions from the ionization region through the orifices toward the ion entrance orifice.

The invention is especially useful in qualitative and quantitative treatment of complex samples in analytical schemes employing mass spectrometry ("MS") coupled with liquid chromatography ("LC"), usually high performance liquid chromatography ("HPLC"). The invention can be especially useful where an atmospheric pressure ionization ("API") technique, such as electrospray ionization ("ESI") or inductively coupled plasma ionization ("ICP") or atmospheric pressure chemical ionization ("APCI"), is employed in LC/MS.

DETAILED DESCRIPTION

Particular embodiments of the invention will now be described in detail with reference to the drawings, in which like parts are referenced by lie numerals. The drawings are not to scale and, in particular, certain of the dimensions may be exaggerated for clarity of presentation.

The apparatus of the invention can be employed with any of a variety of ionization techniques, including for example atmospheric pressure ionization techniques such as electrospray ionization or inductively coupled plasma ionization or atmospheric pressure chemical ionization. The apparatus can be employed with any of a variety of mass analytical techniques, including for example magnetic sector, quadrupole (and other multipole), ion trap, time-of-flight, and Fourier-transform (ion cyclotron resonance) techniques, and tandem MS/MS techniques.

Orifices are "aligned on an ion beam axis" as that term is used herein, where they are configured such that a straight line passing through the center of area of and normal to the plane of at least one (and not necessarily more than one) of the orifices passes through another orifice. It is not necessary, according to this usage, for an orifice to have a geometrically regular shape.

Figure 1:
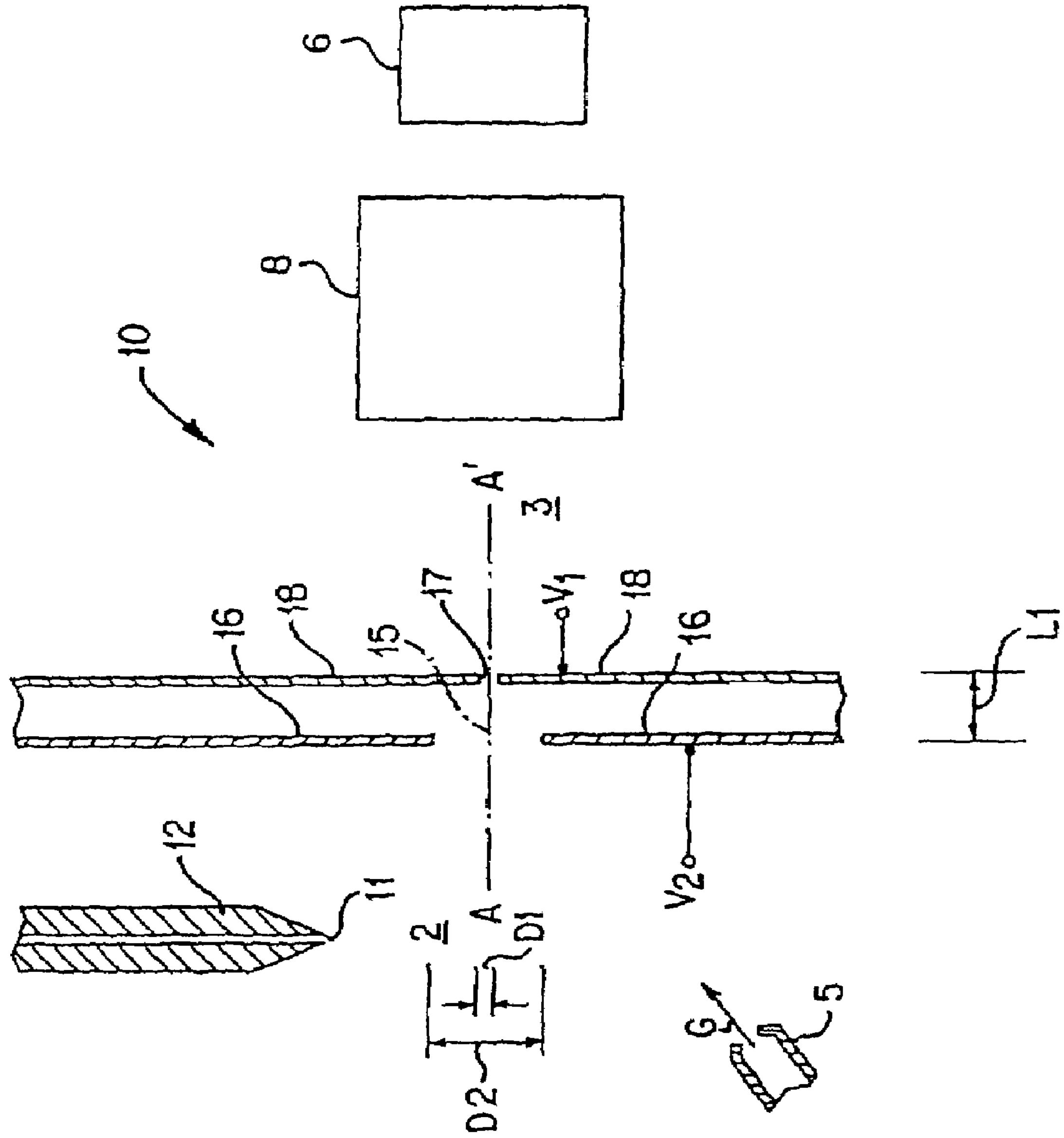
FIG. 1 is a diagrammatic sectional view showing an embodiment of an ion filter apparatus according to the invention.

Referring now to the drawings, then is shown diagrammatically in FIG. 1 by way of example generally at 10 an embodiment of a high pass ion filter according to the invention. An ionization chamber enclosing an ionization region 2 communicates with a vacuum chamber enclosing a vacuum volume 3 by way of an ion entrance orifice 17 in a wall 18. (The walls of the vacuum chamber and of the ionization chamber other than wall 18 are not shown in the Figs.) The vacuum chamber contains a mass analyzer 8 (such as for example a quadrupole mass analyzer) and a detector 6, and in operation the volume enclosed within the vacuum chamber is maintained at a vacuum suitable for the particular type and configuration of mass analyzer. In some mass spectrometer configurations, the vacuum chamber may contain elements (not shown in the Fig.) such as, for example, a mass analyzer, that function at very high vacuum. In other configurations the vacuum chamber may constitute a stage between the ionization chamber and mass analyzer and may contain, for example, ion optical elements or ion guides which operate under vacuum but not at very high vacuum characteristic of operation of the mass analyzer. And, as will be appreciated, depending upon what particular type of mass is employed (for example Fourier-transform ion cyclotron), there may not be a detector separate from a mass analyzer. The ionization chamber is provided with an electrospray assembly 12 having an exit through which the sample is introduced into the ionization region 2 in the form of fine droplets. In operation the volume enclosed within the ionization chamber is maintained at about atmospheric pressure, and ions are entrained in the flow of gas from the ionization region 2 through the ion entrance orifice 17 and into the vacuum chamber downstream. As will be appreciated, the ionization chamber may have any of a variety of configurations, depending in part upon what ionization technique is employed.

Within the ionization chamber a wall 16 has an orifice 15 situated upstream from ion entrance orifice 17, generally between the ionization region 2 and the ion entrance orifice 17. The orifice 15 and the ion entrance orifice 17 are generally circular, and the orifice 15 (having diameter $D_2$) is usually larger than the ion ent orifice 17 (having diameter $D_1$). The diameter $D_1$ of the ion entrance orifice is usually in the range about 0.2 mm to 1.0 mm. The diameter $D_2$ of the first electrode orifice 15 is usually in the range about 0.5 mm to 10 mm, more usually in the range about 1 mm to 2 mm. An axis A A2 passes through the center of ion entrance orifice 17 normal to a plane defined generally by the edge of the orifice, and passes through the opening of orifice 15. The planes defined generally by the edges of the orifices 15, 17 are separated by a distance $L_1$, which is usually in the range about 0.5 mm to about 5.0 mm, and more usually in the range about 1 mm to 3 mm. These dimensions will be selected in consideration of established principles, depending among other factors upon the type of gas employed, the steepness of the gradient, and the molecular masses of the ions being treated. Generally the steepness of the gradient depends upon the distance $L_1$ and the difference in electrical potential between the electrodes associated with the orifice 15 and the ion entrance orifice 17. The configuration of the electrodes and the distance $L_1$ will be selected to avoid voltage breakdown in operation using suitably high potential differences (for discussion of principles relating to voltage breakdown see, e.g., W. H. Kohl, *Handbook of Materials and Techniques for Vacuum Devices*, Van Nostrand Reinhold, 1967). Further, the distance $L_1$ will be made great enough to pct ions entrained in the down flow of gas to reach drift velocities sufficient to stall the lower molecular weight ions, keeping them from entering through the ion entrance orifice.

Walls 16 and 18 are made of an electrically conductive material (typically metal), and each is connected to a source of electrical potential, as shown diagrammatically as $V_2$, $V_1$, respectively, in the Fig. Accordingly, each of walls 16, 18 functions as an electrode. Typically, the electrode associated with the orifice 15 downstream from the ionization region differs from that of the ion source (here the exit opening 11 of the ESI injector 12) with a magnitude and polarity set to attract ions of the desired polarity toward the orifice 15. The electrical potential at the ion source may be allowed to "float", set at ground, or set at a voltage above or below ground. In operation, a high magnitude electrical potential difference $|(V_2-V_1)|$ is applied between the walls or electrodes 16, 18 to create a retarding electric field upstream from the ion entrance orifice 17. That is, the electron 16 associated with the orifice 15 within the ionization chamber is set to provide a high magnitude electrical potential with respect to the ion source (usually in the range −2 kV to −10 kV, more usually in the range −2 kV to −6 kV, for operation in a "positive ion" mode; the polarity is reversed for operation in a "negative ion" mode) and the electrode 18 associated with the ion entrance orifice 17 is set to provide a lower magnitude electrical potential (typically relatively electropositive and in the range above 0 V to +2 kV for operation in a "positive ion" mode). The movement downstream of ions entrained in the flow of gas from the higher pressure ionization region through the orifices 15, 17 into the low pressure chamber downstream is retarded by the opposing electric field.

Because according to the invention the movement of ions is assisted by gas flow from the higher pressure volume in the ionization chamber to the lower pressure volume within the vacuum chamber, higher molecular weight ions have higher drift velocities according to the invention. The retarding voltage gradient upstream from the ion entrance orifice is made sufficiently seep to cause ions having drift velocities below a selected lower limit to stall, so that they fail to pass through the ion entrance orifice. As a consequence, the subpopulation of ions passing through the ion entrance orifice into the vacuum chamber and, eventually, on to the mass analyzer has a lower proportion of lower molecular weight ions than was present in the ionization region.

In some embodiments of the invention, the evaporation of carrier liquid from ions in the ionization region is assisted by passing a flow of warm gas (a "drying gas") through the cloud of droplets. In a configuration as in FIG. 1, the drying gas can be directed (arrows G) from a nozzle 5 generally toward the ionization region 2, as described for example in U.S. Pat. No. 5,412,208. An embodiment of an alternative configuration is shown generally at 110 in FIG. 2, which is in many features similar to FIG. 1, and like reference numerals identify like features in the Figs. Referring to FIG. 2, a cowl 14 within the ionization chamber has an orifice 13 situated upstream from orifice 15, generally between the ionization region 2 and the orifice 15. The cowl orifice 13 is generally circular (having diameter $D_3$), and usually is larger than orifice 15. The diameter of the cowl orifice 13 is usually in the range about 1 mm to 10 mm, sore usually in the range about 2 mm to 5 mm. The axis A A2 passing through the center of ion entrance orifice 17 normal to a plane defined generally by the edge of the orifice passes through the opening of orifice 13. The planes defined generally by the edges of the orifices 13, 15 are separated by a distance $L_2$, which is usually in the range about 0.5 mm to about 5 mm, and more usually in the range about 1 mm to 3 mm.

Figure 2:
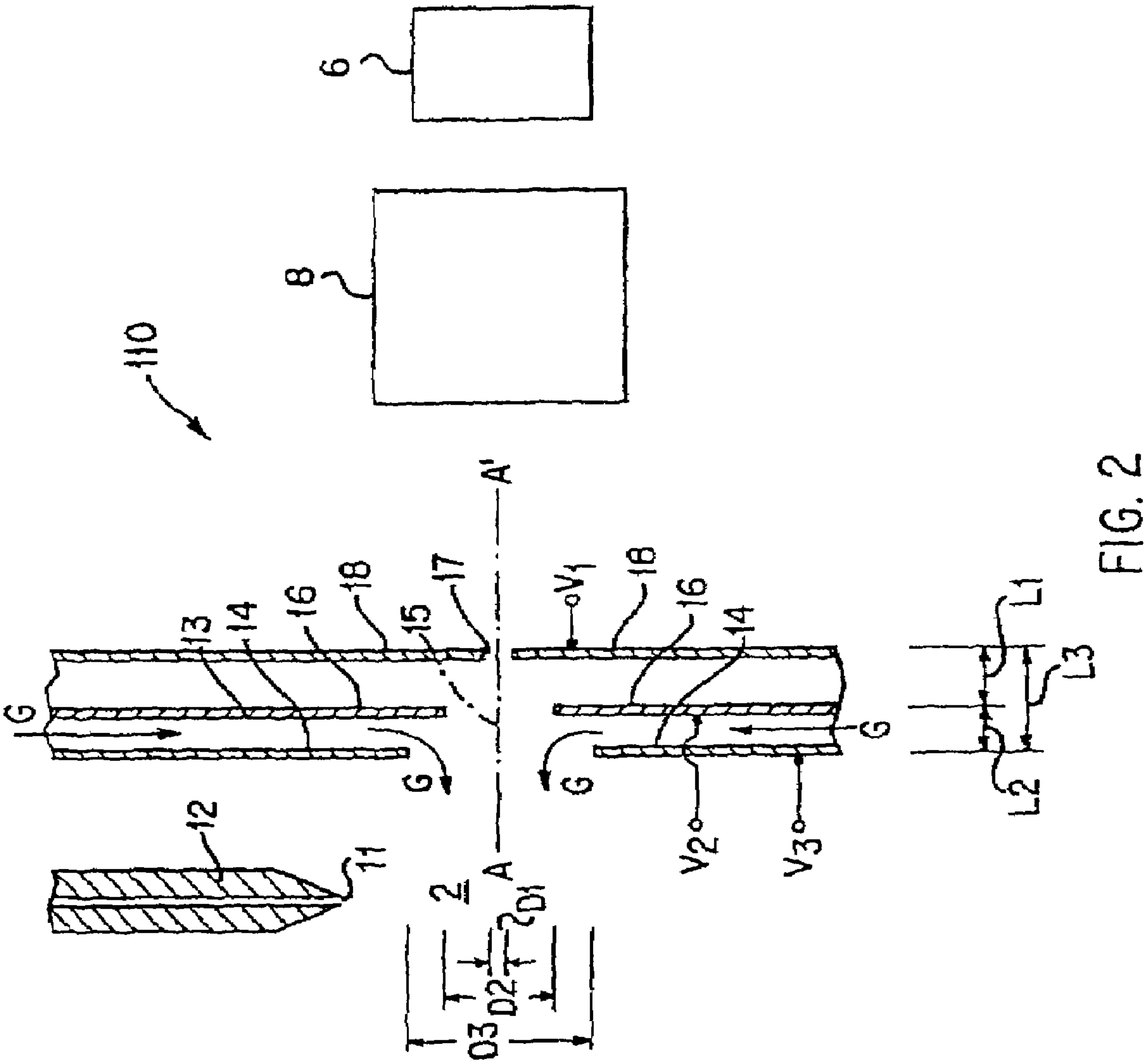
FIG. 2 is a diagrammatic sectional view showing an alternative embodiment of an ion filter apparatus according to the invention.

In the configuration shown in FIG. 2, a source of drying gas (not shown in the Fig.) can supply drying gas into the space between wall 16 and cowl 14, so that the drying gas passes through orifice 13 into the ionization chamber toward the ionization region 2 (arrows G). The cowl orifice is made large enough so that the drying gas flows mostly upstream toward the ionization region, and so that the peripheral flow of drying gas upstream toward the ionization region does not unduly interfere with the more axial downstream flow of gas and ions toward the ion entrance orifice 17.

Cowl 14 is made of an electrically conductive material (typically metal), and is connected to a source of electrical potential, as shown diagrammatically as $V_3$. Accordingly, cowl 14 can function as an electrode, and may be employed together with other electrodes to generate and to shape an electric field within the ionization chamber. Typically (although not necessarily), the voltage $V_3$ at the electrode associated with the cowl orifice 13 differs from that of the ion source (here the tip 11 of the ESI injector 12) with a magnitude and polarity set to attract ions of the desired polarity toward the cowl orifice. As described above with reference to FIG. 1, a high magnitude electrical potential difference $|(V_2-V_1)|$ is applied between the walls or electrodes 16, 18 to create a retarding electric field upstream from the ion entrance orifice 17. An electrical potential difference $|(V_3-V_2)|$ may additionally be applied between cowl 14 and wall or electrode 16 to create an accelerating electric field upstream from the orifice 15. That is, the cowl 14 associated with the cowl orifice 13 is held at an electrical potential relatively electropositive than that of the electrode 16 (typically in the range above 0 V to 2 kV more electropositive) for operation in a "positive ion" mode; the polarity is reversed for operation in a "negative ion" mode. The movement downstream of ions generated in the ionization region through the orifice 13 and toward the orifice 15 downstream is accordingly assisted by the accelerating electric field. Thereafter the movement downstream of ions entrained in the flow of gas from the higher pressure ionization region through the orifices 15, 17 into the very low pressure chamber downstream is retarded by the opposing electric field between orifices 15, 17, as described above; and ions having drift velocities below a selected lower limit stall out between walls 16, 18 and are removed from the ion beam.

By way of illustration, in a particular embodiment of a configuration according to FIG. 2, the API ionization chamber of mass spectrometry apparatus can be provided with first and second walls, each having an orifice situated upstream from the ion entrance orifice, and each connected to a source of electrical potential. With reference to FIG. 2, the dimensions can be as follows in an illustrative embodiment. Diameters: $D_1$ is about 0.5 mm; $D_2$ is about 3 mm; and $D_3$ is about 5 mm; Lengths: $L_1$ is about 1.25 mm; L is about 1.25 mm; and $L_3$ is about 2.5 mm. Operating in positive ion mode, the ESI source potential can be set at ground, and electrical potentials at the electrodes can be set as follows: $V_1$ is about −3.5 kV; $V_2$ is about −4.5 kV; and $V_3$ is about −4 kV. Nitrogen can be used as a drying gas, delivered for example at a temperature about 300° C. from between the first upstream wall and the cowl at a flow rate about 10 L/min. A sample consisting of analytes of various molecular weights in a carrier liquid (solvent) such as methanol:water (50:50) can be delivered to the ionization region by nebulizer-assisted ESI.

In the description above, the ion entrance orifice is configured as an aperture in a flat plate. Other ion entrance orifice geometries can be employed, such as a tube having a wall defining a longitudinal bore having an ion inlet opening at one and an ion exit opening at the other end. Particularly, a capillary tube may be employed as a conduit for ions and gas in the interface between the higher pressure API ionization chamber and the vacuum chamber. The wall of the capillary tube defines a longitudinal bore having an ion inlet end, which is situated in the ionization chamber downstream from the ionization region, and an ion exit end, which is situated in a vacuum chamber downstream.

The tube wall may be constructed of an electrically conductive material (typically metal), and may be connected to a source of electrical potential so that the tube wall itself serves as an ion entrance electrode and the longitudinal bore of the tube serves as the ion entrance orifice.

Alternatively, the tube wall may be constructed of a dielectric material such as a glass and, in such embodiments, at least the ion inlet end of the dielectric tube is provided with an electrode that is connected with a source of electrical potential. U.S. Pat. No. 4,542,293, for example, describes providing electrodes at both the ion inlet end and the ion exit end of a dielectric capillary conduit, and applying an end-to-end electric field opposing the flow of ions through the tube. Ions are entrained in the flow of gas into the inlet end of the capillary from the higher pressure ion source chamber and carried with the gas, against the opposing electrical field, through the lumen of the capillary and out through the exit end of the capillary into the low pressure chamber downstream.

Various mass spectometry apparatus employing a capillary interface between an atmospheric pressure ionization ("API") ion source and the mass analyzer are described, for example, in U.S. Pat. No. 5,838,003 (electrospray ionization ["ESI"]), U.S. Pat. No. 5,736,741 (ESI and atmospheric pressure chemical ionization ["APCI"]), U.S. Pat. No. 5,726,447 (corona discharge ionization). These and any other patents and other publications referred to in this application are hereby incorporated herein in their entirety.

Figure 3:
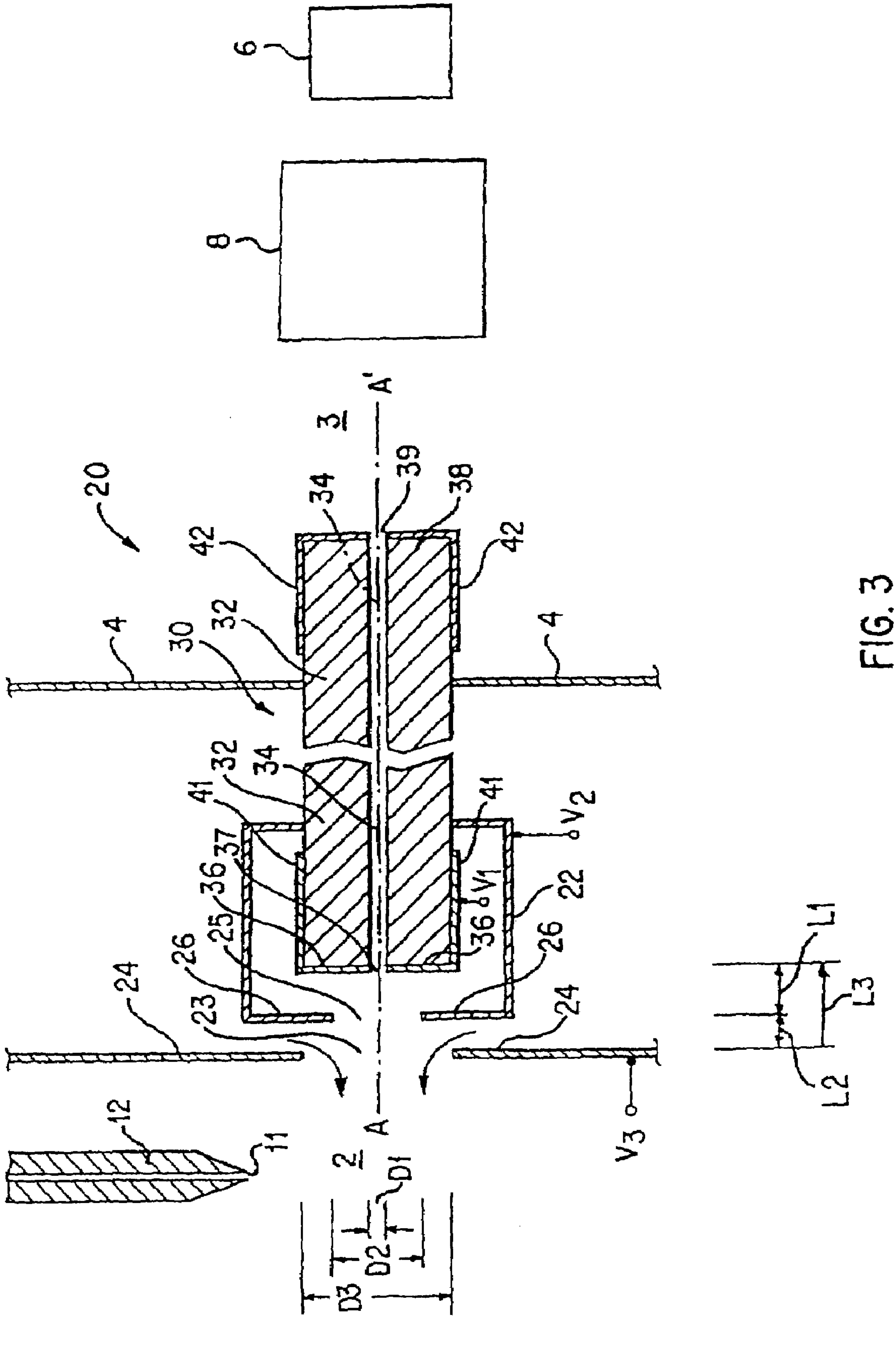
FIG. 3 is a diagrammatic sectional view showing a further alternative embodiment of an ion filter apparatus according to the invention.

FIG. 3 illustrates generally at 20 an embodiment in which the API high pass filer according to the invention is employed in a mass configuration using a dielectric capillary conduit. Referring now to FIG. 3, which is in many features similar to FIG. 1, and like reference numerals identify like features in the Figs., an ionization chamber enclosing an ionization region 2 communicates with a vacuum chamber enclosing a vacuum volume 3 by way of a capillary conduit 30. The capillary conduit includes a tube of a dielectric material, having tube wall 32 defining a lengthwise bore or lumen 34 of capillary dimension. Capillary conduit 30 is supported by wall 4, which forms an upstream wall of the vacuum chamber enclosing the high vacuum volume 3. The tube has an inlet opening 37 to the lumen at an inlet end 36, and an exit opening 39 at an exit end 38. End electrode 41 is associated with the inlet end 36 and end electrode 42 is associated with the exit end 38. The lumen or bore of the capillary constitutes the ion entrance orifice in this configuration, and the inlet end electrode 41, associated with the inlet opening 37 of the ion entrance orifice, is connected to a source of electric potential $V_1$ (not shown in the Fig.).

A wall segment 26 has an orifice 25 situated upstream from the inlet opening 37, generally between the ionization region 2 and the inlet opening 37 of the capillary conduit. The wall segment 26 is made of an electrically conductive material (typically meal) and is connected to a source of electrical potential $V_2$ (not shown in the Fig.), and accordingly it can function as an electrode. The wall segment is conveniently part of an enclosure affixed to the dielectric wall of the capillary tube.

The orifice 25 and the inlet opening 37 to the ion entrance orifice (lumen 34) are generally circular, and the orifice 25 (having diameter $D_2$) usual is larger than the inlet opening 37 (having diameter $D_1$). The diameter $D_1$ of the ion entrance orifice is usually in the range about 0.2 mm to 1 mm. The diameter $D_2$ of the first electrode orifice 25 is usually in the range about 0.5 mm to 10 mm, more usually in the range about 1 mm to 2 mm. An axis A-A' passes through the longitudinal axis of the tube lumen 34, and passes though the opening of orifice 25. The planes defied generally by the edges of the orifices 25, 37 are separated by a distance $L_1$, which is usually in the range about 0.5 mm to about 5 mm, and more usually in the range about 1 mm to 3 mm.

As noted above, wall segment 26 is made of an electrically conductive material, and each of wall segment 26 and inlet end electrode 41 is connected to a source of electrical potential. In operation, a high magnitude electrical difference $|(V_2-V_1)|$ is applied between the walls or electrodes 26, 41 to create a retarding electric field upstream from the inlet opening 37 to the ion entrance orifice (lumen 34). That is, the electrode 26 associated with the orifice 25 within the ionization ch is set to provide a high magnitude electrical potential difference with respect to the ion source (typically in the range −2 kV to −6 kV for operation in a "positive ion" mode; the polarity is revered for operation in a "negative ion" mode) and the electrode 41 associated with the inlet opening 37 to the ion entrance orifice (lumen 34) is set to provide a lower magnitude electrical potential difference from the ion source (typically in the range greater than 0 V to +3 kV for operation in a "positive ion" mode). The movement downstream of ions entrained in the flow of gas from the higher pressure ionization region through the orifice 25 and the inlet opening 37, and thereafter through the ion entrance orifice (lumen 34) into the low pressure chamber downstream is retarded by the opposing electric field.

As noted above with reference to FIG. 2, in some embodiments the evaporation of carrier liquid from ions in the ionization region is assisted by passing a drying gas though the cloud of droplets. The drying gas can be directed (arrows G) from a nozzle situated in the ionization chamber generally toward the ionization region 2. An alternative configuration is shown in FIG. 3. Referring to FIG. 3, a cowl 24 within the ionization chamber has an orifice 23 situated upstream from orifice 25, generally between the ionization region 2 and the orifice 25. The cowl orifice 23 is generally circular (having diameter $D_3$), and is larger than orifice 25. The diameter of the cowl orifice 23 is usually in the range about 1 mm to 10 mm, more usually in the range about 2 mm to 5 mm. The axis A-A' passing through the axis of the lumen 37 passes through the opening of orifice 23. The planes defined generally by the edges of the orifices 23, 25 are separated by a distance $L_2$, which is usually in the range about 0.5 mm to about 5 mm, and more usually in the range about 1 mm to 3 mm.

In this configuration, a source of drying gas (not shown in the Fig.) can supply drying gas into the space between wall 26 and cowl 24, so that the drying gas passes through orifice 23 into the ionization chamber toward the ionization region 2 (arrows G), generally as described above.

Cowl 24 is made of an electrically conductive material (typically metal), and is connected to a source of electrical potential, as shown diagrammatically as $V_3$. Accordingly, as in the embodiment of FIG. 2, cowl 24 can function as an electrode. As described above with reference to FIG. 1, a high magnitude electrical potential difference $|(V_2-V_1)|$ is applied between the walls or electrodes 26, 41 to create a retarding electric field upstream from the inlet opening 37 to the ion entrance orifice (lumen 34). An electrical potential difference $|(V^3-V_2)|$ way additionally be applied between cowl 24 and wall or electrode 26 to create an accelerating electric field upstream from the orifice 25. That is, the cowl 24 associated with the cowl orifice 23 is set to provide an electrical potential relatively electropositive with respect to the ion source (typically in the range greater than 0 V to 2 kV more electropositive) for operation in a "positive ion" mode; the polarity is reversed for operation in a "negative ion" mode. The movement downstream of ions generated in the ionization region through the orifice 23 and toward the orifice 25 downstream is accordingly assisted by the accelerating electric field. Thereafter the movement downstream of ions entrained in the flow of gas from the higher pressure ionization region through the orifice 25 and the inlet opening 37 into the low pressure chamber downstream is retarded by the opposing electric field between orifices 25, 37, as described above; and ions having drift velocities below a selected lower limit stall out between wall 26 and electrode 41 and are removed from the ion beam. Any of a variety of dielectric materials may be employed for construction of the conduit, including for example a glass or a quartz or a ceramic or a plastic such as a polytetrafluoroethylene ("PTFE", Teflon®) or a polyimid (Vespel®).

The electrodes 41 and 42 on the dielectric capillary can be formed in any of a variety of ways. For example, they may be fabricated as metal, or metallic, or metallized caps or endpieces. Or, they may be formed by applying an electrically conductive coating onto the surface of the dielectric material of the tube wall itself.

The decodes 41, 42 can be constructed of a relatively nonreactive electrically conductive metal such as, for example, chromium or silver or gold or platinum. It may be preferred to apply an additional electrically conductive coating onto the surface of a portion of the electrically conductive coating and in conductive relation to it, usually onto the exterior portion, to provide mechanical and other properties not provided by the first-applied electrically conductive material. Where a coating is employed, the coating may be applied to the surface of the dielectric tube by, for example, conventional sputter coating or vapor coating, or by electrodeless plating, or by conventional chemical deposition techniques, using for example a ceramic paint or a metal paint such as a gold paint or silver paint, or, for example, a solution of chrome hexacarbonate in an organic solvent such as chloroform.

EXAMPLE

This example illustrates operation of a prototype having a configuration generally as shown in FIG. 3, constructed generally as follows. A Hewlett-Packard G1946A mass spectrometer employing nebulizer-assisted ESI was provided, having a dielectric capillary with end electrodes and an electrically conductive enclosure at the inlet end having an aperture situated upstream from the inlet opening to the capillary lumen. An electrically conductive cowl was installed in the ionization chamber, having an orifice situated upstream from the aperture in the enclosure, and generally between the ionization region and the inlet opening, resulting in a configuration generally as diagrammed in FIG. 3. The diameter $D_1$ of the inlet opening (that is, of the capillary bore) was about 0.5 mm, the diameter $D_2$ of the orifice in the enclosing electrode was about 3 mm, and the diameter $D_3$ of the opening in the cowl was about 5 mm. The distance $L_1$ between the plane of the orifice in the enclosing electrode and the capillary inlet end electrode was about 2 mm, and the distance $L_2$ between the plane of the orifice in the cowl and the plane of the orifice in the enclosing electrode was about 2 mm. The capillary inlet end electrode, the enclosing electrode, and the cowl were each connected to a source of electric potential, respectively $V_1$, $V_2$, and $V_3$. A source of dying gas was configured to introduce a flow of nitrogen at about 300° C. between the cowl and the enclosing electro and through the cowl orifice toward the ionization region at a flow rate about 10 L/min. A mite of fluorinated phosphonates in acetonitrile:water (95:5) was induced into the ionization chamber by way of the nebulizer assembly.

The voltage $V_3$ was set at −3.5 kV. The voltage $V_1$ at the capillary inlet end electrode was set at −4.5 kV, and the voltage $V_2$ at the enclosing electrode was varied over the range from −4.9 kV to −3.0 kV. The results showed significant reduction in transmission through the ion entrance of ions having molecular mass below about 120, by application of a retarding electrical potential $V_2-V_1$ about 50 V/mm.

Other embodiments are within the claims. For example, the various orifices can be made in any of a variety of apes other than circular, and they may have one dimension much larger than another; for example oval, including elongated oval, or slit-shaped orifices can be employed. Where two or more of the orifices are elongated or slit-shaped, the longer axes need not necessarily be in the same plane.

The API source high pass ion filter according to the invention can be operated together with a capillary high pass ion filter apparatus constructed and operated as described in U.S. patent application titled "Dielectric Capillary High Pass Ion Filter", Attorney Docket No. 10992230-1, which is being filed of even date herewith, the pertinent parts of which are hereby incorporated herein by reference. Such apparatus can be installed in a mass spectrometer and used in connection with the invention disclosed herein substantially as described for example above with reference to FIG. 3. Generally, that apparatus includes a dielectric capillary interface for installation as an ion interface between the higher pressure ionization chamber and the lower pressure environment of a mass analyzer, having end electrodes and at least one electrode associated with the dielectric capillary between the ends. Selected electrical potentials are applied to the electrodes to create an end-to-end electric field generally opposing gas flow-assisted movement of ions from the upstream end to the downstream end of the conduit, and to create a steeper voltage gradient along an upstream segment than along a downstream segment of the capillary.

Where a dielectric capillary conduit is employed, as described for example with reference to FIG. 3, a portion of the surface of the cap lumen can additionally be made electrically conductive, as described in copending U.S. patent application titled, "Dielectric Conduit with End Electrodes", the pertinent parts of which are hereby incorporated herein by reference. Generally, that conduit includes a capillary tube in which the lumenal surface of the bore near at least one end is a surface of an electrically conductive material, which can be formed as an electrically conductive coating on an end portion of the lumenal surface.

What is claimed is:

1. An ionization chamber comprising:

an ionization region for producing ions;

an electrode distanced from said ionization region, said electrode including an orifice; and a region of space interposed between said ionization region and said electrode, wherein at least a portion of said region of space exhibits an electric field that is sufficient to substantially stall a population of ions having drift velocities below a selected lower limit and to substantially prevent said population of ions from passing through said orifice.

2. The ionization chamber of claim 1, wherein said orifice is disposed in a wall of said ionization chamber.

3. The ionization chamber of claim 2, wherein said wall comprises a conductive material.

4. The ionization chamber of claim 1, wherein said orifice communicates with a downstream vacuum chamber.

5. The ionization chamber of claim 1, wherein said ionization chamber is an atmospheric pressure ionization chamber.

6. The ionization chamber of claim 1, wherein said ionization region comprises a nebulizer.

7. The ionization chamber of claim 1, wherein said ionization chamber is an electrospray ionization (ESI) ion source, an inductively coupled plasma ionization (ICP) ion source or an atmospheric pressure chemical ionization (APCI) ion source.

8. The ionization chamber of claim 1, further comprising a second electrode disposed between said first electrode and said ionization region.

9. The ionization chamber of claim 8, wherein a space between said first and said second electrodes is connected to source of drying gas.

10. A mass spectrometry system comprising:

a) an ionization chamber comprising:

an ionization region for producing ions;

an electrode distanced from said ionization region, said electrode including an orifice; and a region of space interposed between said ionization region and said electrode, wherein at least a portion of said region of space exhibits an electric field that is sufficient to substantially stall a population of ions having drift velocities below a selected lower limit and to substantially prevent said population of ions from passing through said orifice;

b) a vacuum chamber in communication with said orifice; and c) a mass analyzer in communication downstream from said vacuum chamber.

11. The mass spectrometry system of claim 10, wherein said mass analyzer comprises a magnetic sector, quadruple, ion trap, time-of-flight, and ion cyclotron resonance Fourier transform or tandem MS/MS mass analyzer.

12. The mass spectrometry system of claim 10, wherein said ionization chamber is an electrospray ionization (ESI) ion source, an inductively coupled plasma ionization (ICP) ion source or an atmospheric pressure chemical ionization (APCI) ion source.

13. The mass spectrometry system of claim 10, further comprising a gas or liquid chromatography device connected to said ionization chamber.

14. The mass spectrometry system of claim 10, wherein said orifice is disposed in a wall of said ionization chamber.

15. The mass spectrometry system of claim 14, wherein said wall comprises a conductive material.

16. A method of filtering ions in an ionization chamber, comprising:

producing ions in an ionization region;

establishing an electric field in a region of space interposed between said ionization region and an electrode having an orifice, wherein said electric field is sufficient to substantially stall a population of ions having drift velocities below a selected lower limit and to substantially prevent said population of ions from passing through said orifice.

17. The method of claim 16, further comprising supplying a drying gas to said ions prior to their entry into said orifice.

18. The method of claim 16, wherein the act of supplying a drying gas comprises the act of supplying nitrogen prior to said ions entering said orifice.

19. The method of claim 16, further comprising communicating ions passing through the orifice to a mass filter.

20. The method of claim 16, wherein the act of producing ions comprises:

receiving an analyte from a chromatography device; and ionizing said analyte.

* * * * *